United States Patent
Ell et al.

(10) Patent No.: US 6,542,326 B1
(45) Date of Patent: Apr. 1, 2003

(54) MICROACTUATOR-INDUCED REACTIVE FORCES FOR FINE POSITIONING A SENSOR

(75) Inventors: Travis Eugene Ell, Oklahoma City, OK (US); John Christopher Morris, Minneapolis, MN (US); Roger Alan Resh, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/560,905

(22) Filed: Apr. 28, 2000

Related U.S. Application Data (60) Provisional application No. 60/162,189, filed on Oct. 28, 1999.

(51) Int. Cl.[7] .............................................. G11B 5/596
(52) U.S. Cl. ................................................. 360/78.05
(58) Field of Search ............................ 360/78.05, 75, 360/78.04

(56) References Cited

U.S. PATENT DOCUMENTS

| | | | |
|---|---|---|---|
| 4,786,994 A | 11/1988 | Carteau et al. ............... 360/75 |
| 4,931,712 A | 6/1990 | DiGiulio et al. ............ 318/625 |
| 5,452,275 A | * 9/1995 | Ogawa ..................... 360/78.04 |
| 5,459,383 A | 10/1995 | Sidman et al. .............. 318/611 |
| 5,471,734 A | 12/1995 | Hatch et al. .............. 29/603.03 |
| 5,502,606 A | 3/1996 | Mori et al. ............... 360/291.7 |
| 5,521,772 A | 5/1996 | Lee et al. ..................... 360/75 |
| 5,621,656 A | 4/1997 | Langley ...................... 700/280 |
| 5,638,267 A | 6/1997 | Singhose et al. ............. 700/28 |
| 5,805,386 A | 9/1998 | Faris ....................... 360/264.4 |
| 5,901,010 A | 5/1999 | Glover et al. ............ 360/78.12 |
| 6,160,676 A | * 12/2000 | Takaishi .................. 360/78.05 |
| 6,483,659 B1 | * 11/2002 | Kobayashi et al. ...... 360/78.04 |

FOREIGN PATENT DOCUMENTS

| EP | 0 924 689 A2 | 6/1999 |
| WO | WO 98/20486 | 5/1998 |

* cited by examiner

*Primary Examiner*—David Hudspeth
*Assistant Examiner*—Mitchell Slavitt
(74) *Attorney, Agent, or Firm*—David K. Lucente; Derek J. Berger (57) ABSTRACT

Piezoelectric elements or similar microactuators perform fine positioning in a system including at least two masses bendably coupled to a larger body. A servo controller receives a position signal from a sensor on the first mass, from which it generates a signal to control microactuators coupling other masses to the body. The movement of the other masses thereby exerts a controlled reactive force upon the body and upon the first mass. Examples include disc drive systems in which the reactive forces are used to counteract one or more unwanted excitations in an actuator body or actuator arm.

10 Claims, 5 Drawing Sheets

MICROACTUATOR-INDUCED REACTIVE FORCES FOR FINE POSITIONING A SENSOR

RELATED APPLICATIONS

This application claims the benefit of U.S. Provisional Application No. 60/162,189 filed on Oct. 28,1999.

FIELD OF THE INVENTION

The present invention relates to servo control systems incorporating both microactuators and position sensors, and more particularly to controlling the movement of position sensors accurately enough for use in an electromechanical information handling system.

BACKGROUND OF THE INVENTION

Precise control of a transducer or similar sensor is becoming more important, particularly in the field of mass storage. Optical and magnetic discs often contain tens of thousands of tracks per radial inch. This density continues to increase rapidly, requiring greater precision in head positioning. In the past, head positioning was typically accomplished by operating an actuator arm with a large-scale motor, such as a voice coil motor, to position a head on a gimbal at the end of an actuator arm. Unfortunately, such large-scale motors often lack sufficient resolution to effectively accommodate high track-density discs. Thus, a high-resolution head positioning mechanism is necessary to accommodate the more densely spaced tracks.

One promising class of head positioning system involves using a high resolution microactuator in addition to the conventional low resolution actuator, thereby effecting head positioning through dual-stage actuation. Various microactuator designs have been considered to accomplish high-resolution head positioning, including piezoelectric, electromagnetic, electrostatic, capacitive, fluidic, and thermal actuators. An example of such structures is provided in U.S. Pat. No. 4,431,934 ("Electrically Actuated Piezoelectric Control Element") issued to Peter Kleinschmidt et al. on Feb. 14, 1984.

Various locations for such microactuators along each actuator arm have been suggested, including at the interface between the gimbal and the head. Such systems are exemplified in U.S. Pat. No. 5,189,578 ("Disk System with Sub-Actuators for Fine Head Displacement") issued to Kenji Mori et al. on Feb. 23, 1993; and in U.S. Pat. No. 5,657,188 ("Head Suspension with Tracking Microactuator") issued to Ryan A. Jurgenson et al. on Aug. 12, 1997.

More pertinent for present purposes is the structure provided in U.S. Pat. No. 6,002,549 ("Dither Microactuators for Stiction Release in Magnetic Disc Drives") issued to Alan David Berman et al. on Dec. 14, 1999. There, a piezoelectric element 26 exemplified relatively near to the rotational axis 14 of the actuator arm 16. The piezoelectric element 26 is employed for fine positioning of a slider 24 relative to tracks 34 on disc 30. A voltage applied to piezoelectric element 26 causes selective expansion or contraction of the piezoelectric element, thereby causing distortion of actuator arm 16 to effect fine positioning of slider 24 over a selected track of rotatable disc 30.

Various methods of contructing and configuring microactuators have been known for some time, and they continue to advance. Computational and cost constraints have nevertheless limited their use in many aspects of position control. Moreover, previous microactuator control systems have not addressed reactive forces that Applicant has found to frustrate fast, dynamic position control. Consequently, existing servo positioning systems will not permit continued increases in performance, such as will be required for further increasing the density of recorded data. There is a therefore a need in the art for efficient servo positioning systems that are effective for preventing or reducing mechanical resonances selectively.

SUMMARY OF THE INVENTION

The present invention provides a novel way to control a servo system of two or more masses bendably coupled to a primary body by microactuators. The controller receives a position signal from a sensor on the first mass, from which it generates a signal to control the microactuator(s) coupling the second mass to the body. The movement of the second mass(es) thereby exerts a controlled reactive force upon the body and upon the first mass that is useful for reducing unwanted components of vibration.

As used herein, "primary" microactuators refer to those coupled between a first mass and a (larger) body, and "secondary" microactuators refer to those coupled between a second mass and the body. Devices of the present invention include at least one primary microactuator and one secondary microactuator. Except as noted, any reference to "moving" a mass will refer to controlling the mass with respect to the body.

In a first embodiment, each mass is coupled to two piezoelectric elements and one flexible pivot, which are also coupled to the body. The piezoelectric elements are biased in compression on each side of the flexible pivot, which is in tension. The first and second mass each include a distal end having a position sensor. The pivots are arranged for substantially paralled operation, allowing each position sensor to move along a curvilinear path defining a respective surface, the surfaces being substantially parallel. The controller oppositely actuates each pair of microactuators simultaneously so that each mass accelerates to induce an equal-magnitude reactive force upon the actuator body. Preferably, the masses are selected so that they have substantially equal rotational inertia and can therefore be driven by a common control signal. Alternatively, at least one of the signals is derived with a predetermined multiplier related to the inertia ratios between the respective masses.

In a second embodiment, data storage discs are interleaved between the several arms of an actuator body. Each of the arms between the discs is coupled to a pair of head-carrying load beams having transverse motion control via a respective microactuator. A selected head follows a track on its disc surface by controlling a voice coil motor and the primary microactuator. At least one secondary microactuator on another arm is accelerated oppositely so as to counteract the primary microactuator's tendency to rotate the actuator body parallel to the disc surface. In a preferred system, two such secondary microactuators are used, and the "tertiary" microactuator (on the same arm as the primary) moves in phase with the primary microactuator. In this way, the tertiary microactuator counteracts the primary microactuator's tendency to twist the shared arm (about an axis parallel to the disc), and the secondary microactuators counteract the shared arm's tendency to rotate the actuator body about its spindle.

In a third embodiment, also with data storage discs interleaved between the several arms of an actuator body, two selected heads transduce signals simultaneously on two data surfaces. Primary microactuators simultaneously provide control signals so that each selected head follows its respective track. At least one unwanted oscillation is systematically reduced by applying a fixed gain amplified version of an existing control signal to at least one microactuator not being used for track following. This improves performance on both selected heads without requiring an additional servo channel.

Further features and benefits of the present invention will become apparent to one of ordinary skill upon a careful review of the following drawings and accompanying detailed description.

DETAILED DESCRIPTION

Numerous aspects of servo positioning that are not a part of the present invention (or are well known in the art) are omitted for brevity, avoiding needless distractions from the essence of the present invention. These include (1) specific circuitry for mathematically combining received sensor signals to derive servo control signals; (2) techniques for constructing microactuators, including parallel or serial arrangements of piezoelectric elements; and (3) biasing and sensor/channel selection mechanisms. Although the examples below show more than enough detail to allow those skilled in the art to practice the present invention, subject matter regarded as the invention is broader than any single example below. The scope of the present invention is distinctly defined, however, in the claims at the end of this document.

Figure 1:
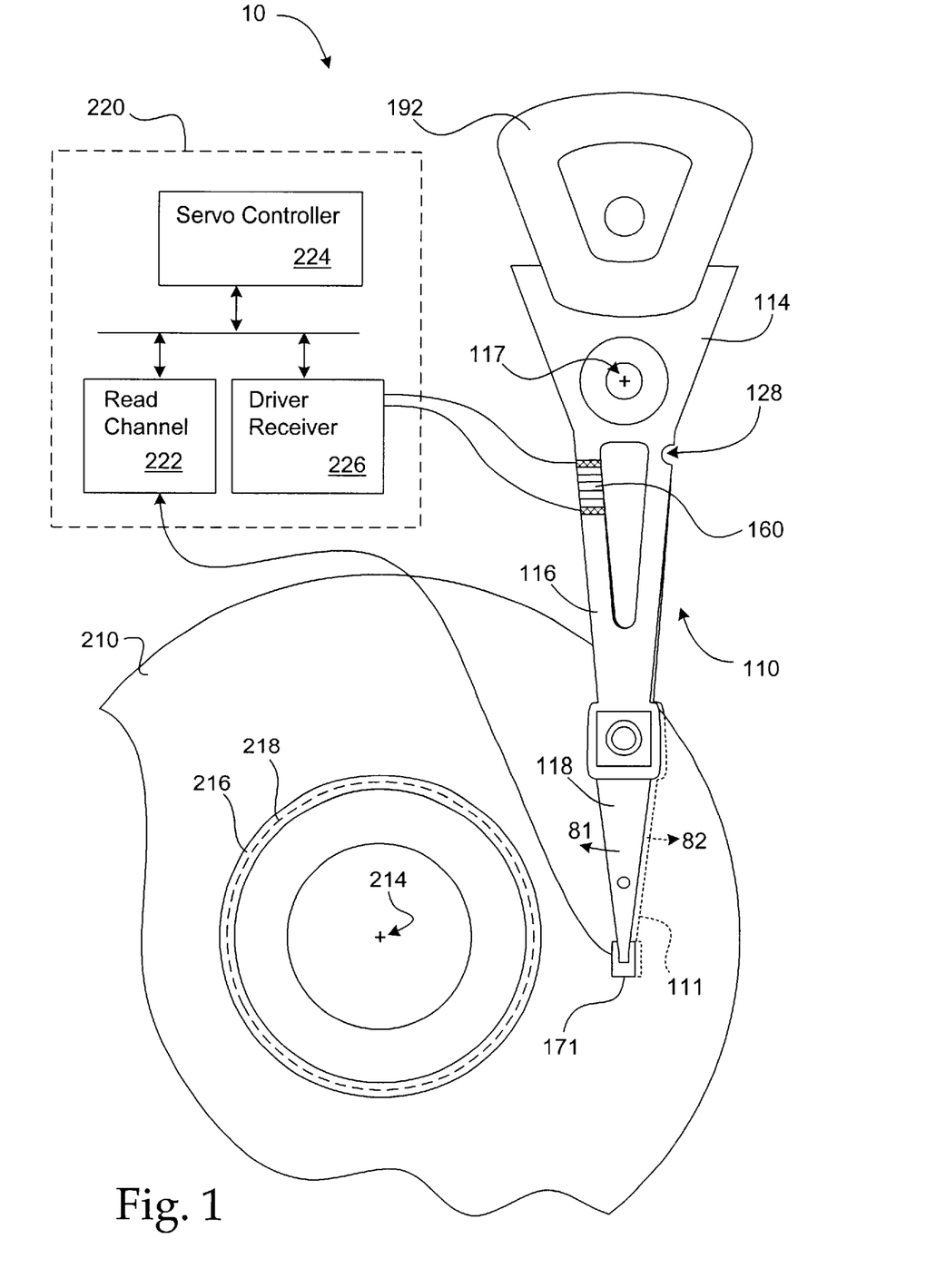
FIG. 1 is a top view of an information handling system with an actuator assembly, with mechanical features substantially to scale.

FIG. 1 is a top view of a disc drive 10 with an actuator assembly 110 suitable for use with the present invention. A stack of one or more discs 210 is mounted so that it can be rotated about axis 214. To read data from track 216, the center of transducer head 171 must be positioned near the center 218 of the track. For coarse adjustment, the body 114 of actuator assembly 110 is rotated about axis 117 so that transducer head 171 moves toward target track 216. Transducer head 171 is supported by load beam 118, which is supported by actuator arm 116 by conventional means. In a portion of the actuator arm 116 that is nearer to the axis 117 than to the head 171, a mechanism for fine adjustment includes a piezoelectric microactuator 160 able to rotate the head 171 in a horizontal plane about flexible pivot 128.

Disc drive 10 also includes disc controller 220. When active, transducer head 171 provides signals to the read channel 222, which provides a signal to servo controller 224 indicating the head's position. Servo controller then causes driver/receiver 226 to activate one or more microactuators 160. With head 171 selected, microactuator control may hold head 171 stationary or move head 171 in a first direction 81 according to art-known methods. Simultaneously, according to a first embodiment of the present invention, another portion 111 of the actuator assembly 110 may be moved in an opposite direction 82 to reduce the net lateral reaction of actuator assembly body 114. Body 114 is a rigid structure having a larger angular inertia about axis 117 than the counterweight portion 111. portion 111 has an angular inertia that is at least as large as that of actuator arm 116 and load beam 118 combined.

Microactuator "movements" are described herein with respect to a "body" that is much more massive than the "mass" that is moved. The microactuator is said to move with respect to the body, also, despite the fact that a portion of it remains stationary. As described herein, this movement is measured by the portion of the microactuator that moves the greatest distance relative to the body.

Figure 2:
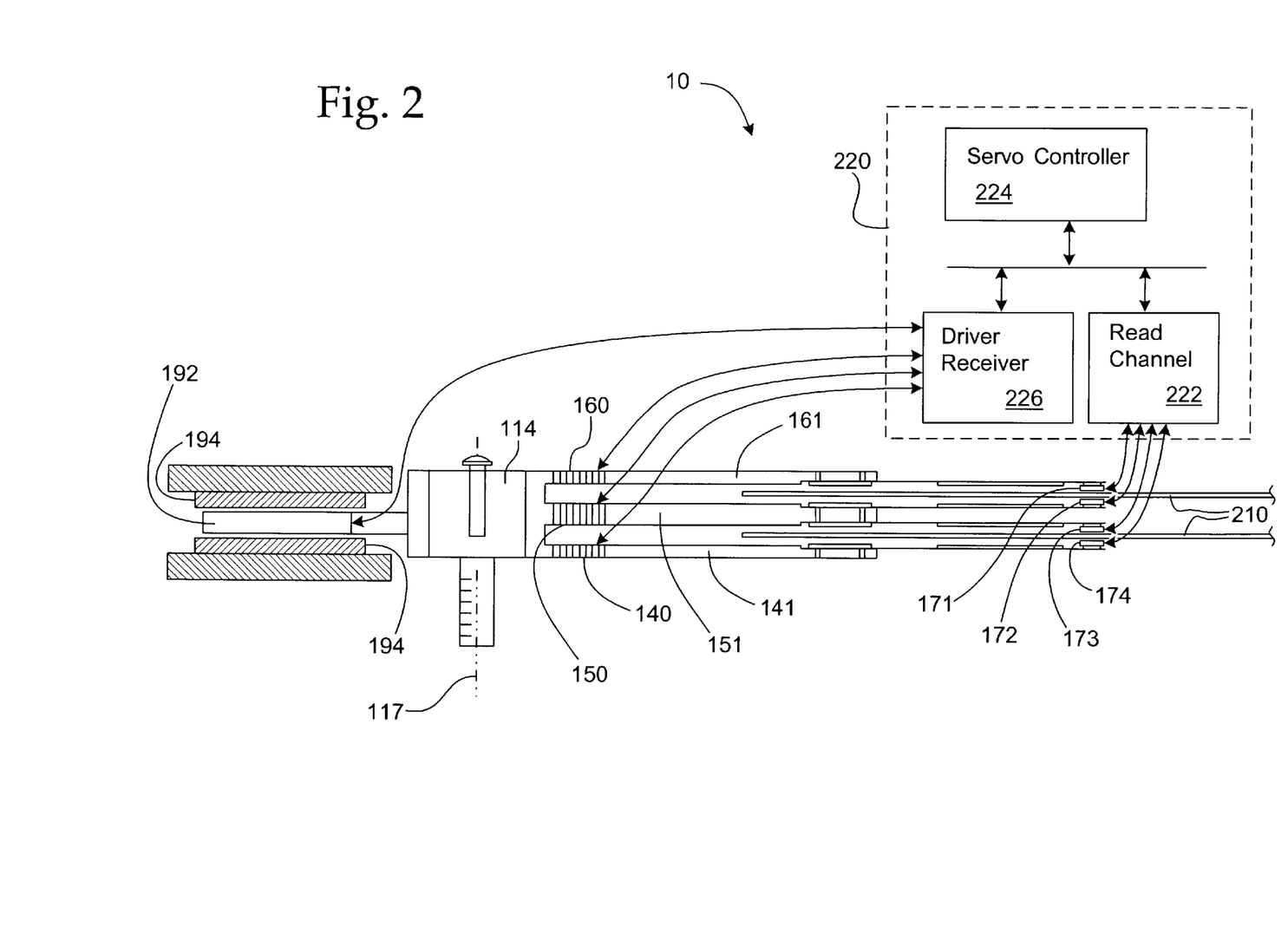
FIG. 2 is a side view of the system of FIG. 1.

FIG. 2 is a side view of the disc drive 10 of FIG. 1, showing more explicitly a conventional arrangement of a motor comprising a voice coil 192 and a pair of magnets 194. When selected, heads 171,172,173,174 are each configured to read or write from a respective surface of a stack of data storage discs 210. First, head 171 is selected. Signals travel to and from selected head 171 via read channel 222, which also provides servo information to servo controller 224. When head 171 has approached a predetermined target (such as track center 218) to within the range that head 171 can be moved by microactuator control, servo controller 224 responds by providing a control signal via driver receiver 226 so as to move selected head 171 toward the target (i.e., clockwise).

One inherent effect of this motion of head 171 is the counterclockwise horizontal reactive torque exerted upon the body 114. In practice, taking this torque into account for precise control of the voice coil motor can be cumbersome. Rather than tolerate this reactive-torque-induced error, according to the first embodiment, servo controller 224 reduces this error by causing a counterweight to move in direction 82. One way to accomplish this is for servo controller 224 to counter-drive microactuator 140, which is coupled to a mass of about the same rotational inertia as that coupled to microactuator 160. This reduces the reactive-torque-induced error as long as microactuator 140 moves mass 141 less than twice as far counterclockwise as microactuator 160 moves mass 161 clockwise.

Optionally, at least one of the microactuators 140 is unavailable for use to control the movement of its respective mass 141. This may be desired if microactuator 140 is being used for sensing shocks, for example, or to conserve current. Because no mass of about the same rotational inertia as that including the selected head is available for use in microactuator counter-balancing control, another mass is used to reduce the reactive-torque-induced error. In FIG. 2, the rotational inertia (j) of mass 151 about axis 117 is more than 50% greater than the rotational inertia (j) of mass 161. Accordingly, a control signal is desirably provided to microactuator 150 so as to move mass 151 about j/J times the distance that mass 161 is moved by microactuator 160. So long as mass 151 is moved within 50% of this "perfect counterbalance" distance, the approximate effect of this control signal will be to halve the error that might otherwise result from the reactive torque exerted upon body 114.

In another embodiment, 100% of the non-selected microactuators 140,150 are driven so as to urge selected head 171 toward the destination track center 218. The additional inertia provided by the counter-movement of these microactuators 140,150 can increase the microactuator bandwidth by at least a few percent, as compared with the response of the selected microactuator 160 alone. Alternatively, where the corresponding masses 141,151 have a combined angular inertia on the order of that of the body 114, in a sufficiently stable track follow mode, microactuators 140,150 can be used in lieu of selected microactuator 160. This allows the selected microactuator 160 to perform other functions, such as controlling the horizontal skew angle during a servo track writing operation or a read retry operation.

Figure 3:
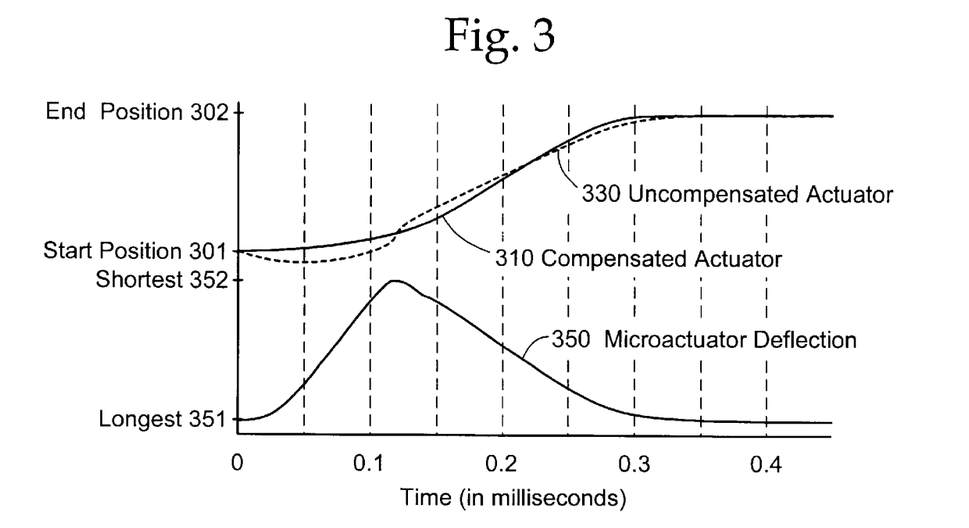
FIG. 3 shows how the system of FIG. 1 can be used to cause a body of an actuator assembly to settle at its destination position more quickly.

FIG. 3 shows how the second embodiment of the present invention can be used to cause a body of an actuator assembly to settle at its destination position more quickly. Curve 310 shows an actuator body's movement from start position 301 to target position 302, at least partially compensated according to the present invention. Curve 310 thus resembles the movement of an actuator body that is not affected by reactive forces arising from microactuator movements. According to conventional servo control methods, a microactuator 160 linking the active head 171 to the body 114 is rapidly deformed from longest position 351 to shortest position 352. This places head 171 near its target position 218 quickly. Unfortunately, the inertial forces of the selected mass 171 cause excitation in the uncompensated actuator, as shown in curve 330. According to the first embodiment of the present invention, these errors are at least partially compensated. Because the body converges to the target position 302 more precisely, the present embodiment allows the sensor to settle more quickly to its target position 302. Sensor signal 370 indicates a sensor's location with respect to its target position, and shows some microactuator-induced offsets that are reduced by the compensation scheme of the present embodiment.

For disc drives that implement the present invention, microactuators should be selected that can respond several times faster than the corresponding actuator motor. For a VCM capable of moving a head 0.5 track widths from a stationary position in a minimum time T, for example, the microactuators coupled from the body to the rigid mass comprising that head should be able to move the head 0.5 track widths in less than T/3.

Figure 4:
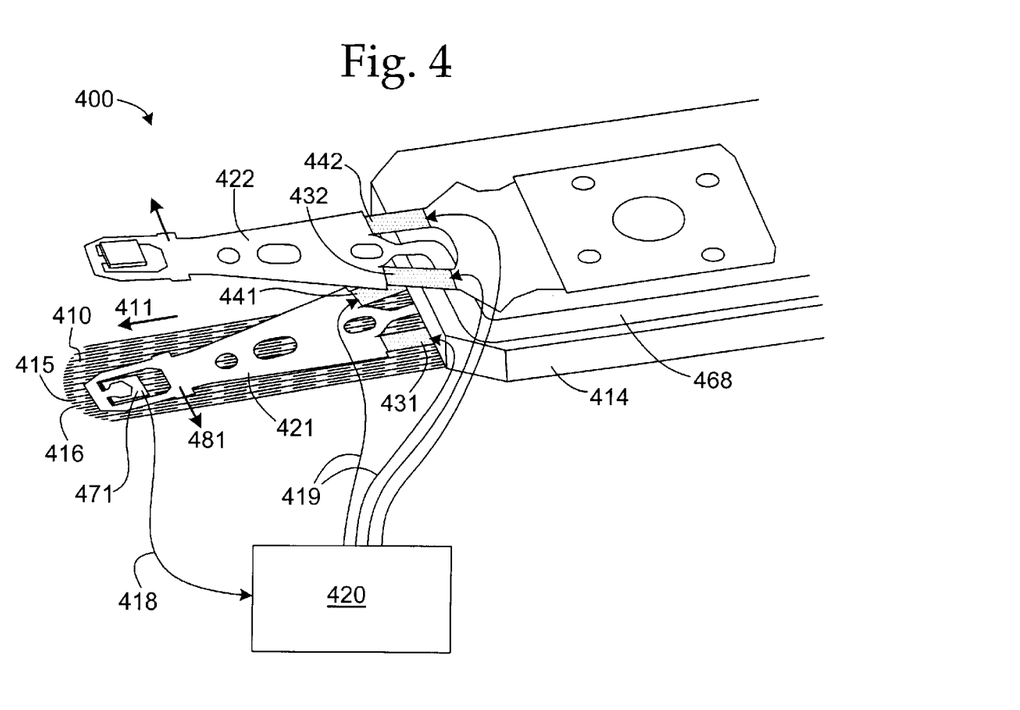
FIG. 4 shows another information handling system incorporating a servo positioning system of the present invention.

FIG. 4 shows another information handling system 400 incorporating a servo positioning system of the present invention. Controller 420 is configured to receive signal 418 from sensor 471 and to generate control signals 419 that expand and contract microactuators 431,432,441,442. Physically, the paths for signals 418,419 are housed within conduits 468 affixed to positionable body 414. Microactuators 431,441 are coupled between mass 421 and body 414. Microactuators 432,442 are coupled between mass 422 and body 414. Parallel tracks 415,416 on a medium 410 such as a tape or disc surface move longitudinally 411 with respect to the sensor 471. In response to a sensor signal 418 indicating a need to move from a present position (e.g. track 415) to another position (e.g. track 416), control signals are selectively provided to expand microactuator 432 and to contract microactuator 442, urging body 414 in direction 481. These same respective signals may be provided to expand microactuator 441 and to contract microactuator 431.

Figure 5:
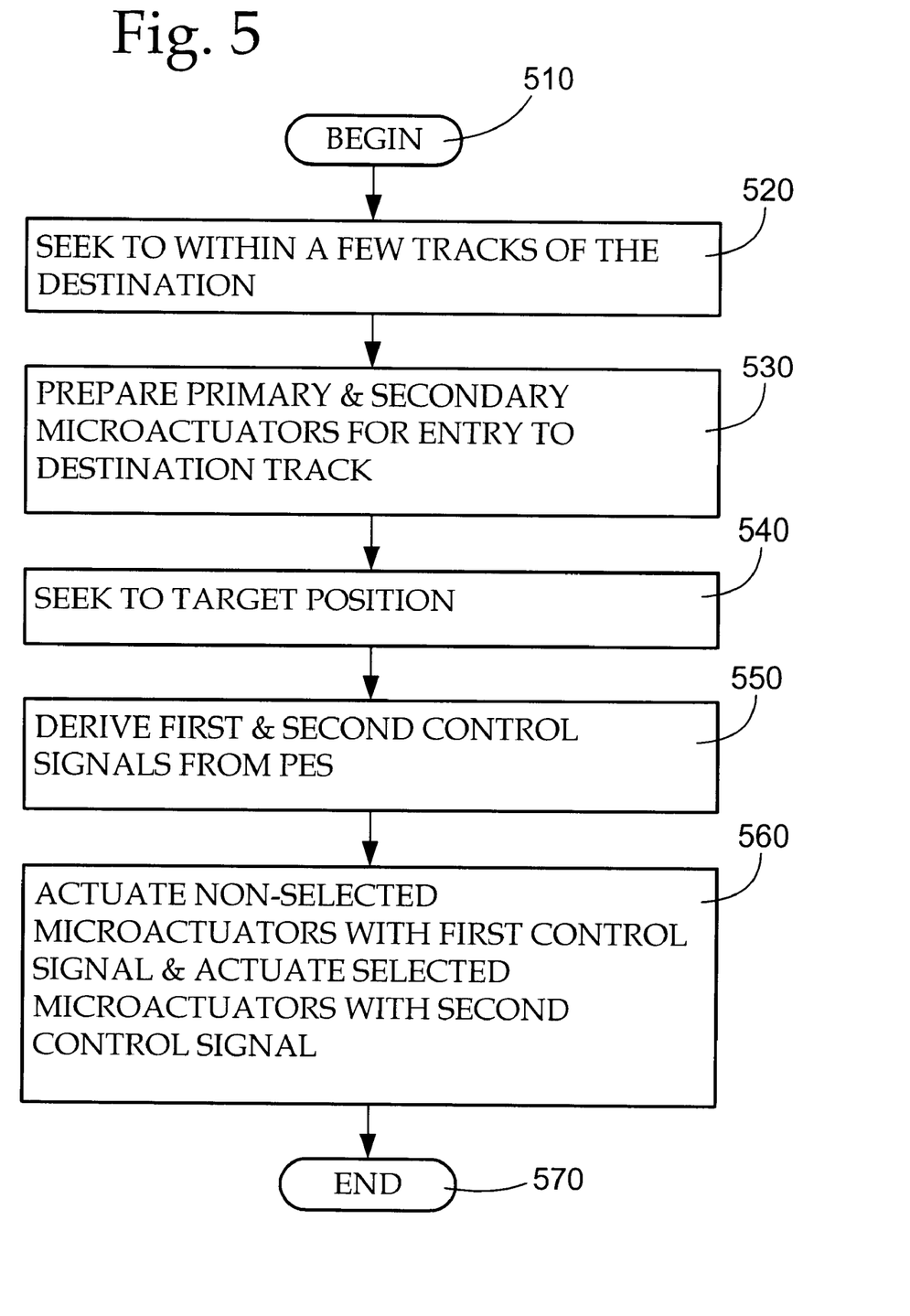
FIG. 5 shows a flowchart of a method of the present invention.

FIG. 5 shows a flowchart of a method of the present invention featuring steps 510 through 570. An actuator body is moved to within a few tracks of the target 520, methods for which are known in the art. As illustrated in FIGS. 3.&4, these can include steps of obtaining a difference signal between the sensed location and the target location. This difference signal can then be used to generate (e.g. through a driver/receiver or similar current amplifier) one or more control signals, one of which controls a motor.

At a desired distance from the destination, microactuators are controlled in preparation for entry into the destination track 530. As shown in FIGS. 1 & 4, this can include situating a selected head toward the destination and/or moving non-selected heads away from the destination. A short seek is performed 540 to enter the destination track, after which a position error signal (PES) is available. First and second control signals based on the PES are then calculated 550 and used to actuate secondary and primary microactuators 560, respectively.

Figure 6:
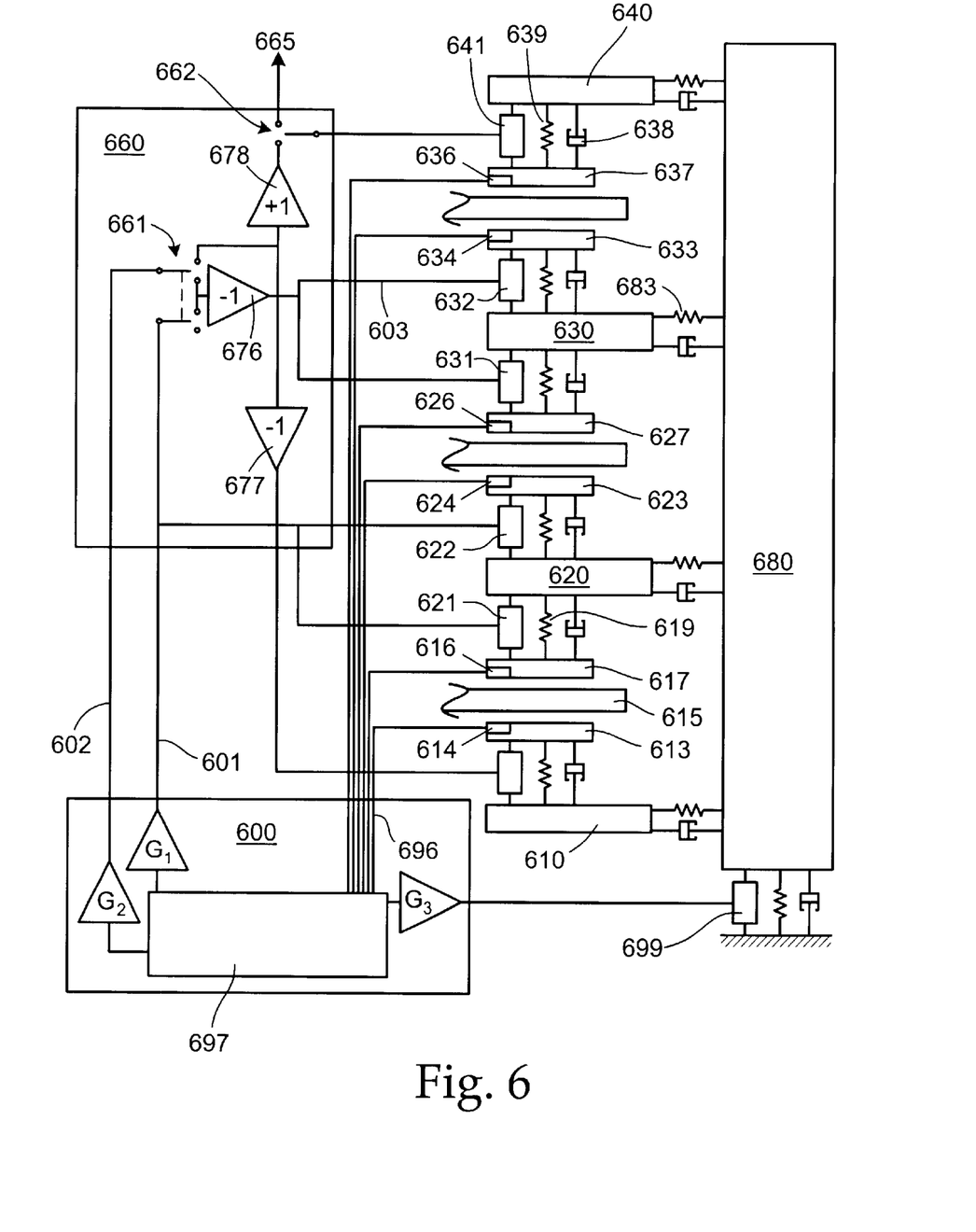
FIG. 6 is a schematic depiction of the third embodiment of the present invention, using more than one servo channel for improved microactuator control.

FIG. 6 is a schematic depiction of an embodiment of the present invention using two servo channels to allow simultaneous track following on two data surfaces of a disc stack. The actuator assembly includes a block 680 coupled to four arms 610,620,630,640. Optionally, the two end arms 610, 640 have about 50 to 70% of the rotational inertia of the middle arms 620,630, each pair being about equal in size and configuration.

A servo controller 600 includes a circuit 697 for deriving servo control signals for coarse control by motor 699, and for deriving fine control signals on two additional channels, systems for which are known in the art. According to the present invention, the servo controller passes these signals each through a power amplifier. The amplified signals 601, 602 are then received by a selectable channel coupling mechanism 660.

For clarity and explicitness, the mechanism 660 is depicted schematically to include a double-pole double-throw switch 661, two inverting amplifiers 676,677, a unity gain buffer 678 and another switch 662. In practice, this mechanism 660 is easily and preferably replaced by a MUX/DEMUX arrangement or similar circuit or by software. With the aid of present teachings, this substitution is an ordinary matter of design choice. As shown, each switch 661,662 has an upper position and a lower position.

Irrespective of the position of switch 661, signal 601 passes directly to control microactuators 621,622, so that these two always operate in phase with one another. In systems vulnerable to arm torsion excitation, this in-phase motion may be preferable to the arm-level scissors-like motion described conjunction with FIG. 4.

With switch 661 in its upper position, control signal 601 also passes through inverting amplifier 676, so that an inverted signal is received by the microactuators coupled to arm 630. If the delay induced by inverting buffer 676 is suitably short, the masses 627,633 of arm 630 move substantially out of phase with the masses 617,623 of arm 620. Their net torque on block 680 about its axis is therefore canceled (i.e. opposed so as to reduce its net magnitude). Note that many actuator assemblies (including that of FIG. 1) are vulnerable to lateral rotational vibrations. Because of their mass and bearing construction, however, they are not ordinarily vulnerable to roll excitations being transmitted between arms 620,630.

It is assumed that FIG. 6 depicts a microactuator configuration like that of FIG. 4, where the effective pivot of each actuator 621 is less than ten times closer to its corresponding sensor 616 than to the axis of rotation of the actuator assembly. It is also assumed that J/j is less than about 500, where J is the combined rotational inertia of the arms 610,620,630,640 together with the block 680, and j is the rotational inertia of each mass 623, about the actuator's axis of rotation. More preferably, J/j is less than 100. With these assumptions, the net torque cancellation described in the foregoing paragraph can be important.

It should be noted that with switch 661 in its upper position, the second microactuator control signal 602 passes through unity gain buffer 678 to microactuator 641, provided that switch 662 is in its lower position. This allows rotary compensation between mass 613 and mass 637, despite the fact that the arm associated with each 610,640 has only one microactuator. With suitable DEMUX circuitry between the signals received from the heads, any one of the four middle heads 616,624,626,634 can track follow simultaneously with either the top or the bottom heads 614,636.

With switch 661 in its upper position, control signal 601 can be derived from the position signal 696 received from head 634. Configuring circuitry 697 to provide a suitable control signal 601 for this purpose is optionally conventional and in any event is not a critical part of this invention. Note that $G_1$ can be −1 if the circuitry 697 is conventional. What is extraordinary about this configuration is its specific use of the position-indicative signal 696 received from a sensor 634 on a first mass 633 to control the movement of at least one other mass 623,627 advantageously.

With suitable read channel circuitry, head 636 can track follow simultaneously with head 634. Signal 602 is derived from a position-indicative signal 696 received from head 634 by ordinary methods and is provided to microactuator 641. Note that this will ordinarily require a second read channel.

With switch 661 in its lower position, heads 616,624 move independently of heads 626,634. In fact, the depicted configuration is switchable so that any two non-successive heads can track follow simultaneously.

FIG. 6 further includes at least one microactuator that can be used as an acceleration sensor. With switch 662 in its upper position, microactuator 641 is configured to provide an output signal 665 indicative of a component of vibration aligned with the plane of the discs 615. A preferred embodiment of the present invention provides switching circuitry that allows at least one microactuator 641 on an arm 640 to be used as either a tracking control or as an acceleration sensor.

The depicted configuration can alternatively be used so that both servo channel control signals 601,602 are used to enhance the track following performance of head 616 with the aid of unconventional information sources. With switch 661 in its lower position, for example, gains $G_2$ and $G_3$ could each be computed as a sum with one term derived from acceleration sense signal 665. It should therefore be understood that the broad general meaning encompassed in signals "derived from" other signals is not confined to conventional analog methods.

By way of review in conjunction with FIG. 6, certain aspects of the present invention relate to an apparatus including a large, fairly rigid body 620 flexibly coupled to two or more masses 617,623. By "fairly rigid," it is meant that the large rigid pieces of the body 620 are coupled together by joints having an effective spring constant more than double that of joints 619 joining a mass 617 to the body 620. As shown in FIG. 6, each flexible joint is shown as a (negligible) damper 638 in parallel with a spring 639. In typical disc drive actuator assemblies, each arm 630 is affixed to its block 680 by a joint properly represented as a stiff spring 683. In effect, the arms and block thus combine to form a fairly rigid composite body. This composite body will be affected by an active microactuator 621 moving a sufficiently large distal mass 617 in a circumferential direction.

Sensor 616 is able to sense its radial position relative to a disc 615 and to generate a position-indicative signal 696. When sensor 616 is selected for track following, the microactuator(s) 621 between the sensor 616 and the body 620,680 are defined to be "primary." Control circuitry including controller 600 is configured to derive a control signal based on the signal 696 from the selected sensor 616, and to provide the signal to at least one secondary microactuator 631,632. The control circuitry similarly derives a second control signal that is received by a tertiary microactuator 622. The selection of a particular circuits for controller 600, amplifiers 601,602, and selectable channel coupling mechanisms 661 within the scheme of the present invention are matters of design choice, and can optionally use art-known circuits and/or software.

For example, the sensor 616 of FIG. 6 optionally provides a sensor signal 696 indicative of an offset from a target position (such as a track center 218 of FIG. 1). In this case, secondary microactuators 631,632 are preferably configured to receive inverted signals from inverting buffers 674,675 so that they are actuated in a direction that tends to reduce the offset. In another aspect, one of ordinary skill can alter the selectable channel coupling mechanism 661 of FIG. 6 so that one or two of the masses 617,623 are moved in phase, but that substantially all of the others 613,627,633,637 urge their respective masses in a direction that tends to reduce the offset.

With or without secondary microactuators 631,632 the apparatus of FIG. 6 desirably includes another microactuator 622 in contact with the same arm 620 as the primary microactuator 621. Microactuators 621,622 are both in contact with and able to move arm 620. By operating these microactuators 621,622 in substantially parallel directions, substantially in phase, the tendency of the arm 620 to roll is reduced. Note that "roll" refers to a rotation of a portion of arm 620 in a plane that is roughly perpendicular to the discs 615.

Further elaborating on the method of FIG. 5, the depicted step 550 of deriving control signals 601,602 from the difference signal can be performed conventionally by the circuitry 697 in controller 600. According to the present invention, for example, head 616 is selected and generates a signal 696 indicative of position such as a Gray code signal, a digitally encoded track number identifier. The target track is subtracted from the track number to calculate an offset. With switch 661 in its upper position, a VCM control signal is derived from this offset and is provided to motor 699 to seek to the desired track. When the offset is sufficiently small, signal 601 is derived so that microactuator 621 performs a short seek to move head 616 over the target track.

As a result of the depicted circuitry, another control signal 603 is derived to control secondary microactuators 631,632 so as to cancel the torque exerted by microactuator 621 upon body (i.e., the actuator assembly including the arms 610, 620,630,640 and the block 680). Tertiary microactuator 622 also receives a signal to cancel an unwanted excitation, the roll torque exerted upon arm 620 by microactuator 621.

All of the structures and methods described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, steps of the above methods can be reordered while maintaining substantially the same functionality, without departing from the scope and spirit of the present invention. In addition, although the preferred embodiments described herein are largely directed to moving sensors along a fixed curvilinear path, it will be appreciated by those skilled in the art that many teachings of the present invention can be applied to other systems such as two dimensional micropositioning systems without departing from the scope and spirit of the present invention.

What is claimed is:

1. A servo positioning apparatus comprising:

a positionable body;

a first mass and a second mass, the first mass including a first sensor configured to generate a sensor signal indicative of the first sensor's position;

one or more primary microactuator(s) coupled between the first mass and the body;

one or more secondary microactuator(s) coupled between the second mass and the body; and a controller configured to derive a first control signal from the sensor signal and to provide the first control signal to at least one of the secondary microactuator(s).

2. The servo positioning apparatus of claim 1 in which the first mass and the second mass are about equal in size.

3. The servo positioning apparatus of claim 1 in which the sensor signal is indicative of an offset from a target position and in which the first control signal is configured to urge the secondary microactuator(s) in a direction that tends to reduce the offset.

4. The servo positioning apparatus of claim 1, in which an unwanted vibration is induced in the body by the primary microactuator(s), and in which the unwanted vibration is reduced by actuation of the secondary microactuator(s).

5. The servo positioning apparatus of claim 1 in which the body has an axis of rotation and a rotational inertia J about the axis, and in which the second mass has a rotational inertia j about the axis, J/j being less than 100.

6. The servo positioning system of claim 1 in which the primary and secondary microactuators comprise piezoelectric transducers.

7. An information handling system including:

a voice coil magnet generating a magnetic field;

at least one rotatable data storage disc; and the servo positioning apparatus of claim 1, in which the positionable body includes a voice coil positioned across a part of the magnetic field, in which the controller is configured to provide a coarse control signal able to actuate the voice coil, and in which the first sensor is a transducer head able to read data from the data storage disc.

8. A method of using the servo positioning system of claim 1 comprising steps of:

(a) calculating a difference between the sensor signal and a target value to derive a difference signal;

(b) deriving a first control signal from the difference signal; and (c) actuating at least one of the secondary microactuators with the first control signal.

9. In a system including a positionable body, a first mass and a second mass each coupled indirectly to the body, the first mass including a first sensor configured to generate a sensor signal indicative of the first sensor's position, a method for positioning comprising steps of:

(a) calculating a difference between the sensor signal and a target value to derive a difference signal;

(b) deriving a first control signal from the difference signal; and (c) actuating at least one microactuator coupled between the second mass and the body to move the second mass relative to the body, so that a reactive force is exerted upon the body.

10. An actuator assembly comprising:

a first mass and a second mass each pivotably coupled to a third mass, the first mass including a sensor able to generate a signal indicative of the sensor's position; and means for selectively pivoting the second mass relative to the third mass based upon the position-indicative signal.

* * * * *